(12) United States Patent
Guedon

(10) Patent No.: US 8,165,861 B2
(45) Date of Patent: Apr. 24, 2012

(54) PRINTED CIRCUIT ANALYSIS METHOD AND DEVICE

(75) Inventor: Stephane Guedon, Saint Jean de Moirans (FR)

(73) Assignee: S.A. Edxact, Voiron (FR)

( * ) Notice: Subject to any disclaimer, the term of this patent is extended or adjusted under 35 U.S.C. 154(b) by 942 days.

(21) Appl. No.: 11/795,511

(22) PCT Filed: Nov. 3, 2006

(86) PCT No.: PCT/EP2006/068074
§ 371 (c)(1),
(2), (4) Date: Jul. 17, 2007

(87) PCT Pub. No.: WO2007/051838
PCT Pub. Date: May 10, 2007

(65) Prior Publication Data
US 2008/0133201 A1    Jun. 5, 2008

(30) Foreign Application Priority Data

Nov. 4, 2005  (FR) ...................................... 05 53354

(51) Int. Cl.
*G06F 17/50* (2006.01)
*G06F 9/455* (2006.01)

(52) U.S. Cl. .......................................... 703/13; 716/106

(58) Field of Classification Search .................... 703/13, 703/19, 16; 716/106
See application file for complete search history.

(56) References Cited

U.S. PATENT DOCUMENTS

| | | | |
|---|---|---|---|
| 5,568,558 A | 10/1996 | Ramm et al. | |
| 6,871,334 B2 * | 3/2005 | Mabuchi et al. | 716/5 |
| 7,277,804 B2 | 10/2007 | Gebbie et al. | |
| 7,315,212 B2 * | 1/2008 | Floyd et al. | 330/305 |
| 2001/0029601 A1 * | 10/2001 | Kimura et al. | 716/19 |
| 2005/0288914 A1 | 12/2005 | Gebbie et al. | |
| 2006/0004551 A1 * | 1/2006 | Freund | 703/2 |
| 2006/0031055 A1 * | 2/2006 | Sheehan | 703/14 |
| 2007/0005325 A1 * | 1/2007 | Gong et al. | 703/14 |
| 2007/0299647 A1 * | 12/2007 | Bolcato et al. | 703/14 |
| 2009/0172613 A1 | 7/2009 | Suaya et al. | |
| 2010/0004886 A1 | 1/2010 | Charlet et al. | |

OTHER PUBLICATIONS

Chan et al. 2001., "Practical Consideration in RLCK Crosstalk Analysis for Digital Integrated Circuits". 7 Pages.*
French Preliminary Search Report dated Jan. 5, 2009, FR 0853661.
French Preliminary Search Report dated Apr. 8, 2009, FR 0854580.
U.S. Appl. No. 12/477,846, filed Jun. 3, 2009.
French Preliminary and PCT Search Report, PCT/EP2006/068074, 4 pgs (Feb. 2, 2007); FA 673404 & FR 0553354, 6 pgs, (Jul. 8, 2006).

(Continued)

*Primary Examiner* — Paul Rodriguez
*Assistant Examiner* — Eunhee Kim
(74) *Attorney, Agent, or Firm* — Nixon Peabody LLP

(57) ABSTRACT

A simulation method of an electronic circuit or a printed circuit, represented in the form of masks and connections, includes the definition of, on one hand, inputs and outputs of circuit networks, and, on the other, internal components of each network; the formation of a reduced model of each network; and the simulation of the network using this reduced model. In the event of an unsatisfactory simulation result, the modification of one or more networks, the formation of a second reduced model, and the simulation with said new reduced model, are performed. In the event of a satisfactory simulation result, production of the circuit can be undertaken.

34 Claims, 9 Drawing Sheets

OTHER PUBLICATIONS

Van Der Meijs, N.P. et al., "An Efficient Finite Element Method for Submicron IC Capacitance Extraction", Proceeding of the Design Automation Conference, Las Vegas, (Jun. 25, 1989), Proceedings of the Design Automation Conference (DAC), New York, IEEE, US, vol. CONF. 26, pp. 678-681, XP000145872, ISBN: 0-89791-310-8.

Kerns, Kevin J. et al., "Stable and Efficient Reduction of Large, Multiport RC Networks by Pole Analysis Via Congruence Transformations", IEEE Transactions on Computer Aided Design Service Center, Piscataway, NJ, US, vol. 16, No. 7 (Jul. 1997), pp. 734-744, XP011007450, ISSN: 0278-0070.

Vanoostende, Paul, et al., "DARSI: RC Data Reduction", IEEE Transactions on Computer Aided Design of Integrated Circuits and Systems, IEEE Service Center, Piscataway, NJ, US, vol. 10, No. 4, (Apr. 1, 1991), pp. 493-500, XP000219194, ISSN: 0278-0070.

Lai, Glenn G. et al., "Hinted Quad Trees for VLSI GeometryDRC Based on Efficient Searching for Neighbors", IEEE Transactions on Computer-Aided Design, 15(3): 317-324, (Mar. 1996).

Horowitz, Mark, "Resistance Extraction From Mask Layout Data", IEEE Transactions on CAD, CAD-2(3): 145-150, (Jul. 1983).

Kapur, Sharad et al., "Large-Scale Capacitance Calculation", in $37^{th}$ Design Automation Conference, pp. 744-749, (2000).

Pong, T.S. et al., "A Parasitics Extraction and Network Reduction Algorithm for Analog VLSI", IEEE Trans. on Computer-Aided Design, vol. 10, No. 2 (Feb. 1991).

Krauter, B. et al., "Layout Based Frequency Dependent Inductance and Resistance Extraction for On-Chip Interconnect Timing Analysis", in $35^{th}$ Design Automation Conference, pp. 303-308, (1998).

Kanapka, Joe et al., "Fast Methods for Extraction and Sparsification of Substrate Coupling", in $37^{th}$ Design Automation Conference, pp. 738-743, (2000).

Kerns, Kevin J. et al., "Preservation of Passivity During RLC Network Reduction Via Split Congruence Transformations", DAC (1997), pp. 34-39.

Radke, Richard J., "A MAT LAB Implementation of the Implicitly Restarted Arnoldi Method for Solving Large-Scale Eigenvalue Problems", Dept. of Computational and Applied Math., Rice University, Houston Texas, pp. 1-94, (Apr. 1996).

Sorensen, D.C., "Implicit Application of Polynomial Filters in a K-Step Arnoldi Method", SIAM Journal on Matrix Analysis and Applications, vol. 13, No. 1, pp. 357-385, (Jul. 30, 1991).

Lehoucq, R.B. et al., "Deflation Techniques for an Implicitly Restarted Arnoldi Iteration", SIAM Journal on Matrix Analysis and Applications, vol. 17, pp. 789-821, (Oct. 1996).

Odabasioglu, Altan et al., "PRIMA: Passive Reduced-Order Interconnect Macromodeling Algorithm", IEEE, pp. 58-65, (1997).

Odabasioglu, Altan et al., "Practical Considerations for Passive Reduction of RLC Circuits", IEEE, pp. 214-219, (1999).

Chen, Wai-Kai, "The circuits and filters handbook", CRC Press, XP002523235, pp. 1271-1273 (2003).

De Berg, M. et al, "Computational Geometry: Algorithms and Applications", pp. 183-210, Springer-Verlag (1997).

Faure, R. et al., "Précis de Recherche Opérationnelle: Méthodes et Exercices," ("Handbook for Operations Research: Lessons and Practice Exercises,"), 5th Edition, Sciences Sup., Dunod, Jan. 2004, pp. 60-93.

Office Action in U.S. Appl. No. 12/477,846, mailed Jul. 6, 2011.

* cited by examiner

PRINTED CIRCUIT ANALYSIS METHOD AND DEVICE

CROSS REFERENCE TO RELATED APPLICATIONS OR PRIORITY CLAIM

This application is a national phase of International Application No. PCT/EP2006/068074 entitled "Method And Device For Analyzing Integrated Circuits", which was filed on Nov. 3, 2006, which was not published in English, and which claims priority of the French Patent Application No. 05 53354 filed Nov. 4, 2005.

FIELD OF THE INVENTION AND STATE OF THE RELATED ART

The invention relates to the field of printed circuits and methods and devices-enabling the analysis thereof.

The invention makes it possible to enhance both the performances and precision of analyses of parasitic phenomena in printed circuits.

New generations of printed circuits (micro and nano-technology) are increasingly complex. The systems to verify the physics of these circuits are faced with a performance reduction problem, caused by the excessively high sum of signals to be processed.

FIG. 1A represents steps in the creation of a printed circuit. Two steps S1 and S2 are referred to as the specification and functional design respectively. Step S3 represents the physical design step, particularly of masks which will be used for the production of the circuit, and it is followed by a mask production step S4.

Finally, step S5 is a test step.

Step S3 may be broken down into a positioning step S31 during which a design of the relative shapes and positions of the masks with respect to each other is conducted, along with a routing step S32 (establishment of links between the components) and a verification step S33 of the physics of the components.

In turn, this last step comprises an extraction step S331 (or modelling step) and an analysis step S332.

Step S331 accounts for the description and technological characteristics of the components as they are to be produced by the founder. These characteristics are fixed, and cannot be modified.

The simulation step S332 consists, on the basis of the results of the step S331, of simulating input voltages and verifying corresponding output voltages between different blocks of the component.

The physical verification step S33 is a crucial step in the design and production of a new printed circuit. In fact, it consists of detecting the defects due to the physics of the materials to validate the start of production of the Printed Circuit (PC) or not.

At the present time, this verification step suffers from the problem that all the parasitic effects, which are however very numerous, are not taken into account. These effects are summarised in table I below.

These effects are not taken into account due to the imposed limitation:
firstly, by the computer used during the verification, with respect to the random access memory, mass storage, speed, computation precision,
and, secondly, by the user who requests a rapid reliable response, preferentially on the same day or the following day.

Therefore, there is a bottleneck between the extraction of the physical model S331 and its analysis S332.

In fact, the extraction creates an R, L, C, K network representation of all the circuit's imperfections.

For example, two close connection lines between two components may cause, at high frequencies, untimely conduction between these two lines. This parasitic relationship is represented by a capacitance C. Similarly, there is a resistive relationship R for the resistance of a line, and there are inductive and inductive mutual relationships L and K for the effects induced by the magnetic field.

This model, in the form of numerous networks, is a linear model with a varying number of relationships per point.

This number is continually increasing with new technologies.

FIG. 2 represents a simple network of electrical connections. However, there are thousands and sometimes millions of such small networks assembled in a circuit, which interact with each other and/or with the substrate on which they are produced; in addition, inductive type parasitic effects start to appear with the decrease in the size of circuits, on which, simultaneously, component densities are increasing.

In the prior art, there are three types of networks used to perform modelling. Resistive networks R, RC (Resistive, Capacitive decouplings, Internal Capacitive couplings), RCc (Resistive, Capacitive decouplings, internal Capacitive couplings and inter-network capacitive couplings), RLC (Resistive, Inductive, Capacitive decouplings, internal Capacitive couplings) and finally RLCcK (Resistive, Inductive, Capacitive decouplings, internal Capacitive couplings, inter-network Capacitive couplings, internal inductive mutual couplings and inductive mutual coupling between networks) networks.

The parasitic effects in the digital part of the printed circuit (e.g. connections between transistors) are of all types and the sub-networks are very numerous. They may be processed separately if there is no coupling between the connection lines and grouped in coupled lines otherwise (Coupled RLCK), to be processed in "packets of sub-networks".

The lines between the analogue components or some components, such as turns, require a large number of connections, but with a more limited number of sub-networks. RLCK networks can also frequently be processed separately.

Finally, it is necessary to account for the substrate which, particularly at high frequencies, is not perfect. It consists of

TABLE I

| INTERCONNECTIONS | HOUSINGS | SUBSTRATE | COMPONENTS | POWER MESH |
|---|---|---|---|---|
| Dishing (or erosion), notches, slits, cracking, perforations metal filling, wire distortion Noise, Coupling, voltage peaks Electro-migration Inductance | Input/output port density Current density Frequency Housing-related interference Thermal effects | Substrate-related interference Coupling, noise Thermal effects | Short channel model Local disk variations Interference models Sub-threshold model Multi-Vth operation | Voltage drop Current density Electro-migration Hot point |

RC network blocks interconnected by Capacitances. It is a strongly coupled model (Coupled RC) difficult to decouple for processing. The substrate poses problems particularly in analogous technology, in a very substantial manner once the technology falls below 130 nm. In addition, it is difficult for a substrate to create a model, because large software programs are required for such an operation, with a view to a 3D analysis of the substrate.

At the present time, the extracted parasitic networks are described in files or databases the size of which may rapidly exceed the storage capacities of the computers or computation means used, the parasitic data being always defined by passive component connections. The physical measurements vary and increasingly complex models are developed to account for all the phenomena induced.

The transfer of the models becomes a genuine bottleneck caused by the variety, multitude and size of the electrical models.

A simplified organisation chart of the entire production is represented in FIG. 1B, on the basis of the positioning and routing steps compiled under the reference S310.

Definition steps of mask drawings for lithography and etching, not represented in FIG. 1B, may be performed between this step S310 and the following step S331.

The extraction step S331 is broken down into two sub-steps: one basic extraction (S3310, for geometry, connectivity and equipotentials) and parasitic effect extraction S3311.

The following step is that of simulation, S332 already commented on above. Step S333 represents the result of the simulation and the choice to be made, following this simulation, to start the component production process (step S4), or not.

If this step is not started, due to an unsatisfactory simulation result, a modification of the positioning and routing S3330, and the extraction and simulation operations are performed. In this case, it is necessary to recalculate everything, particularly all the components extracted for the entire circuit.

In other words, not only are the calculations cumbersome, complex and use up computation time, but it is also necessary to repeat all of these operations when the simulation results are not suitable. In other words, any modification, with another verification, involves repeating the represented cycle entirely.

In addition, the extracted models are numerous and of different representations. Frequently, the same number of extractors and models is required. Then, it is difficult or impossible to reconnect these models together to achieve a complete simulation.

The document US 2001/029601 describes an analysis method only to be able to incorporate a substrate in the simulations. Therefore, it consists of a simplification thereof before being connected to the other RC or RLC type models not reduced in file form ("netlist"). The underlying problem of the invention described in this document is that of the incorporation of the signals passing through a semi-conductor substrate and which interfere with circuit components connected to the substrate.

In the method proposed in this document, the entire substrate matrix is not inverted but, on the other hand, locally, in order to simplify the internal node connections, inversions are required. In other words, arc elimination of internal nodes is performed, by means of successive but local inversion. It consists of a polynomial method, which is very complex as it is necessary to perform a large number of calculations in parts, internal node by internal node, with extensive heuristics for precision control.

In addition, in this document, it is necessary to predefine the order of decomposition. However, it is possible to predefine such an order for the substrate, if the modelling hypotheses are known, but it is not possible within a general framework. In addition, in this document, if the order of decomposition becomes high, the computation becomes very complex (with inversion steps). Therefore, the method described in this document enables a simple reduction, for each node, which can also work for low frequencies, but not for the highest current frequencies, greater than 5 GHz.

The document by Kevin J. Kerns et al., IEEE Transactions on Computer Aided design of IC and Systems, vol. 16, no 7, 1997-07, p. 734-744, describes a method which does not make it possible to store the data after reduction. Therefore, it is not possible to make changes to the model found. In addition, the systems processed are only equation systems strictly defined as positive. Finally, the technique described in this document does not make it possible to unify the representation of data for all network types, including RCc, RLC, or RLCK or RLCcK.

Therefore, the problem arises of finding a new method and a new verification device, used to perform these operations more simply, more rapidly, and with less data processing means.

The problem also arises of finding a new method—and a corresponding device—that can be adapted to any type of circuit or network, including R, RCc, RLC, or RLCK or RLCcK.

DESCRIPTION OF THE INVENTION

According to the invention, the data captured are represented not in the form of an electrical network as is conventionally carried out, but in the form of a compressed matrix digital base, that can be directly processed by analysers or simulators and updated directly by the extractors or any linear modelling signal of the physical effects.

The term compressed matrix digital base refers to a matrix representation of the admittance transfer functions between connection points. These connections are of Resistive, and/or Capacitive, and/or Inductive and/or inductive mutual origins.

All the connections do not have the same effect from one point to another. The base is said to be reduced when only the most appropriate connections are retained. Compression of the matrix representation occurs in compressed writing by column of hollow matrices. The hollow matrix comprises three vectors wherein two are integers and one a floating value. The size of a matrix may be calculated according to the following formula:

$$N(\text{int}) + NNZ(\text{int}) + NNZ(\text{double}),$$

where N refers to the dimension of the matrix and NNZ to the number of non-zero real or integer values.

The compressed matrix digital base is the set of compressed matrices forming the sub-network equation systems. There are the same number of conductance and susceptance (or susceptance and inductance or susceptance, inductance and reluctance) matrices as sub-networks. The base formed in this way can be used to save the matrices on disk or in storage media and run queries to select the matrix subsets to be loaded in memory.

The electrical networks comprising resistive, Capacitive and Inductive arcs are represented in reduced digital form with a controlled precision. The precision may be controlled using a single parameter, that of the operating frequency. A compressed and reduced system is valid below the operating frequency. In order to increase the system precision, the operating frequency is increased.

According to the invention, an electronic circuit test method comprises:
  a step consisting of reducing the circuit into blocks each having input and output blocks,
  a circuit operating parameter calculation step.

According to the invention, a simulation method of an electronic circuit or a printed circuit, represented in the form of masks and connections, comprises:
  a) the definition of networks of the circuit, along with, on one hand, inputs and outputs of each network, and, on the other, internal components from each network,
  b) the formation of a reduced model of each network comprising:
    b1)•the formation of a conductance or resistance matrix, along with a capacitance or susceptance or susceptance and inductance or susceptance, inductance and reluctance matrix of these inputs and internal components of the network,
    b2)•the reduction of the conductance or resistance matrix of the internal components, along with the capacitance or susceptance or susceptance and inductance or susceptance, inductance and reluctance matrix of said internal components,
  c) the simulation of the network using this reduced digital model,
  d) in the event of an unsatisfactory simulation result, the modification of part of the masks and/or connections of one or more networks, the formation of a second reduced model, and the simulation with said new reduced model.

In the event of a satisfactory simulation result, the circuit may be produced.

According to another definition of the invention, a simulation method of an electronic circuit or a printed circuit, represented in the form of masks and connections, comprises:
  the breakdown or splitting of the circuit into networks or sub-networks,
  the reduction of the internal connections of each network,
  the storage of reduced matrices of the conductances (or resistances) and capacitances (or susceptances or susceptance-inductances, or susceptance-inductances-reluctances) of each network,
  the simulation of the circuit using these data, and if applicable the modification or one or more networks or its external-external and external-internal connections.

The invention is used to produce a complete system for the simulation of the physical models of an entire printed circuit, which comprises for example one or more analogue parts and/or one or more digital parts and/or at least one substrate, a housing if required. It provides a unified digital representation, that is reducible and directly adapted to the simulators for all these parts.

According to the invention, from the extraction step, a digital model is generated, that can be modified by part and interpreted directly by the analysers.

Therefore, the method according to the invention makes it possible to enhance this model, or this base, in an incremental manner.

It also makes it possible to access simplified linear systems for any distribution resolution of the diagnostic problem.

To enable an analyser of parasitic effects to process large models, the system comprises a reducer of the linear models of the type either R, C, RC, or RLC or RLCK.

The matrix base may be completed by an electric model reading interface. For this, formats and databases exist, that are used for the description of the electrical networks.

Via such an interface, the reduction adopts any model format at the input.

A model is processed by preparing the reduction and stored in a matrix numeric base. A set of methods is then used to process, directly in input/output form, the information contained in the base.

The description of the electrical models is defined by an extractor which is used to isolate the internal components of each circuit from the components connecting the circuit to the outside and/or the spurious components.

The extractor creates the parasitic connections in the circuit. At the input, it uses the description of the lithographic masks ("Layout") along with the description of the technologies of the circuit or the geometric description of the Printed Circuit and the mathematical representation of the physical measurements for the parasitic connections. The result is an electrical model (electrical networks) of the connections between the different components of the circuit.

It then generates a network comprising parts or sub-circuits of the overall circuit, both for the analogue part, and for the numeric part, the substrate and the housing.

To minimise the use of the memory, this extraction is preferentially hierarchical (it observes the sub-circuit breakdown).

The models extracted may then be enhanced or modified locally without re-extracting everything each time the design engineer makes a change. The values extracted supply a matrix representation directly to prepare the reduction or prepare the analysis.

The analyses process the model, reduced, stored in digital base format, for example. To increase the performances further, the analysis is hierarchical and accounts for the simulation vectors to simplify the model.

A simulation vector is the set of electrical excitation values at the circuit input. For a sub-network, and therefore sub-system, hierarchy, the vector presented at the top of the hierarchy is cascaded from sub-system to sub-system modified by each resolution.

In order to enable the modification of the system input/output connection values, the completely reduced model is not stored, intermediate matrix blocks leading to the reduction. Only the internal part is reduced to prepare the processing.

The reduced writing obtained according to the invention enables the harmonisation of the types of existing models in one mathematical representation, along with the reduction, as a function of the operating frequency, electrical models, and finally the possibility of updates and processing by parts of the mathematical model.

The reduction, of the internal part of a network or a sub-network of a circuit, for example during step b2) mentioned above, may be obtained by removing the connections wherein the specific frequency is greater than the operating frequency of the network. This step preferentially uses a projection in a reduced base. This reduction step makes it possible to obtain a reduction rate greater than 95%.

According to one embodiment, the conductance or resistance matrices of the components other than the internal components, and the capacitance or susceptance or susceptance-inductance, or susceptance-inductance-reluctance matrix of said components other than the internal components, are hollow matrices, which may be stored in memory. In the event of an unsatisfactory simulation result, said hollow matrices are modified.

The circuit networks are preferentially defined so as have low couplings between them. A network is for example subject to low coupling if the number $n_e$ of its external nodes is low or very small compared to the number $n_i$ of its specific internal nodes, or if the number $n_e$ of its external nodes and the number $n_i$ of its specific internal nodes complies with the equation: $n_e^2 < n_i$.

According to one embodiment, step d) comprises:
the indication of at least one network to be modified and/or at least one node or the coordinates of a node of said network,
at least one modification of the reduced model of said network.

The reduced network model may be of the RC or RLCK type.

The circuit may contain digital means and/or analogue means and/or be on a substrate and/or be in a housing.

The models of several networks may be stored in memory in a database, the modification of part of the masks of one or more networks, referred to as modified networks, resulting in a modification of the files of said database corresponding to said modified networks.

The modification of one or more networks, or of a part of the connections of one or more networks, referred to as modified networks, may be a direct modification of the files of said database corresponding to said modified networks.

The invention also relates to a simulation device of an electronic circuit, represented in the form of masks and connections, comprising:
a) means to define, on one hand, inputs and outputs of networks of the circuit, and, on the other, its internal components,
b) means to form or calculate a reduced model of each network, comprising:
b1)•means to form or calculate a conductance or resistance matrix of the internal components, along with a capacitance or susceptance or susceptance and inductance or susceptance, inductance and reluctance matrix of these inputs and internal components of the network,
b2)•means to reduce the conductance or resistance matrix of the internal components, along with the capacitance or susceptance or susceptance and inductance or susceptance, inductance and reluctance matrix of said internal components,
c) means to simulate the circuit using this reduced model,
d) in the event of an unsatisfactory simulation result, means to modify part of the masks and/or connections of one or more networks, to form a second reduced model, and to perform a simulation with said new reduced model.

In such a device according to the invention, the reduction means may comprise means to eliminate connections wherein the specific frequency is greater than the operating frequency of the network and/or means to carry out a projection in a reduced base.

Such a device according to the invention may also comprise means storing the conductance or resistance matrices in memory, along with the capacitance or susceptance or susceptance-inductance or susceptance-inductance-reluctance matrices, the matrices stored in memory being preferentially hollow matrices.

Such a device may also comprise means to modify, in the event of an unsatisfactory simulation result, said hollow matrices.

Storage means may store the geometric coordinates of components of each network in memory.

Means to modify a part of the masks and/or connections of one or more networks may comprise means to indicate:
at least one network to be modified and/or at least one node or the coordinates of a node of said network,
at least one modification of the reduced model of said network.

A device according to the invention may also comprise means storing the geometric coordinates of components of each network in memory.

The models of several networks may be stored in memory in a database, the modification of part of the masks of one or more networks, referred to as modified networks, resulting in a modification of the files of said database corresponding to said modified networks.

The modification of part of the connections of one or more networks, referred to as modified networks, may be a direct modification of the files of said database corresponding to said modified networks.

The invention also relates to an electronic circuit production device, comprising a simulation device of an electronic circuit according to the invention, and means to produce said circuit in the event of a satisfactory simulation result.

Irrespective of the embodiment of a method or a device according to the invention, the latter provides a full stream of physical verifications. The invention makes it possible to generate a database which models a system, but also to adjust this mathematical model or said database.

DETAILED DESCRIPTION OF SPECIFIC EMBODIMENTS

A parasitic connection network extraction method will first be described.

It consists of modelling the parasitic connections induced by high-frequency current inductions.

This extraction process starts from the lithographic mask layout, or the data processing description of said masks. This layout is the diagram of the layers of the different components (geometry) and their connections.

These masks are organised in layers, and each of these layers contains the geometric shapes to serve as a negative during the production of the circuit.

Each layer also contains the technological profiles or information, i.e. the technical characteristics of materials such as the impedance as a function of the distance between the components, the relative permittivity, the permeability of the materials and the temperature, or the diffusion characteristics, doping profiles, etc. For example, each material has its own resistivity per section. A section has a limited cross-section and length.

All the sections for all the components or geometric components defines the resistive network. This is referred to as the extraction R.

Modelling steps will be indicated, as an example. Other models are possible, such as the "housing" and substrate type modelling or thermal modelling. In fact, modelling is used to express a model in the form of passive component networks.

These steps are implemented not for the entire network, but network by network. For example, in FIG. 3, the modelling of a portion 7 of the entire circuit is performed, which may be reused for any similar circuit 7'; the same procedure is followed for another portion 17 etc. Preferentially, the similar parts in the circuit are identified and a single model is extracted, applicable to each of these parts. In this way, it is then possible to sequence the calculations depending on what is to be modelled: resistivity, or coupling, or delay, etc.

It is possible firstly to classify the geometric objects according to their functional role in the selected circuit, for example when the geometric components have been positioned manually (in analogue mode) or when the positioning has been optimised (in digital mode). The basis components such as the transistor, resistor, capacitance and connections, are recognised and compared to the electrical diagram accounting for the equipotentials. This is referred to as LVS ("Layout Versus Schematic").

Figure 4:
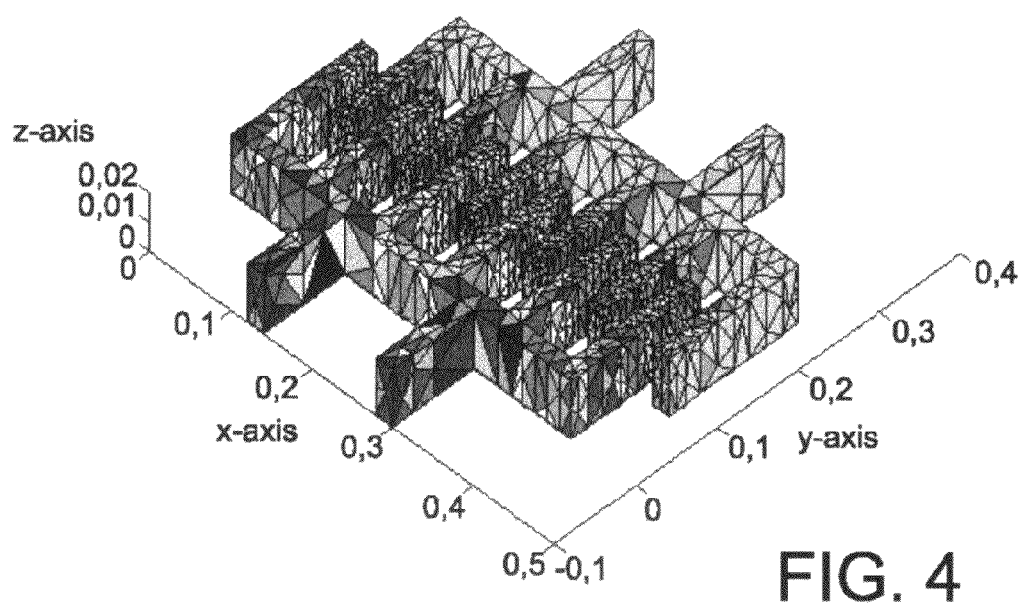
FIG. 4 is the representation of a breakdown mesh of the 3D geometric components.

It is then possible to render the three-dimensional space discrete, in order to apply the parasitic connection calculation formulas, as described in the publication by M. de Berg, M. van Krevel, M. Overmars, and O. Schwarzkopf. Computational Geometry: Algorithms and Applications. Springer-Verlag, 1997. The results is a 3D mesh (an example of which is given in FIG. 4).

In the remainder of this document, the parasitic connections will be calculated at the points of this mesh.

During this step, the points are stored in memory in a simple access structure as described in the article by G. G. Lai, D. S. Fussell, and D. F. Wong. Hinted quad trees for VLSI geometry drc based on efficient searching for neighbours. IEEE Transactions on Computer-Aided Design, 15(3):317-324, March 1996.

Figure 5A:
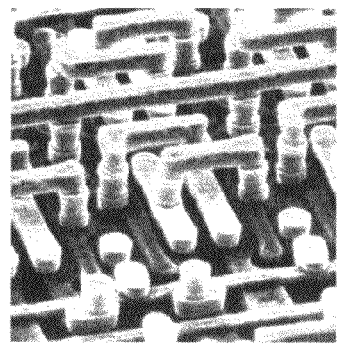
FIGS. 5A and 5B represent a resistive model of an interconnection line.
Figure 5B:
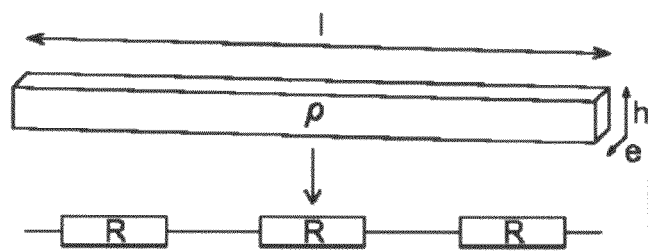

The resistive imperfection of the interconnection circuits between the components can then be defined. FIGS. 5A and 5B represent a resistive model of an interconnection line (in this respect, see: M. Horowitz and R. W. Dutton. Resistance extraction from mask layout data. IEEE Transactions on CAD, CAD-2(3):145-150, July 1983).

Figure 6A:
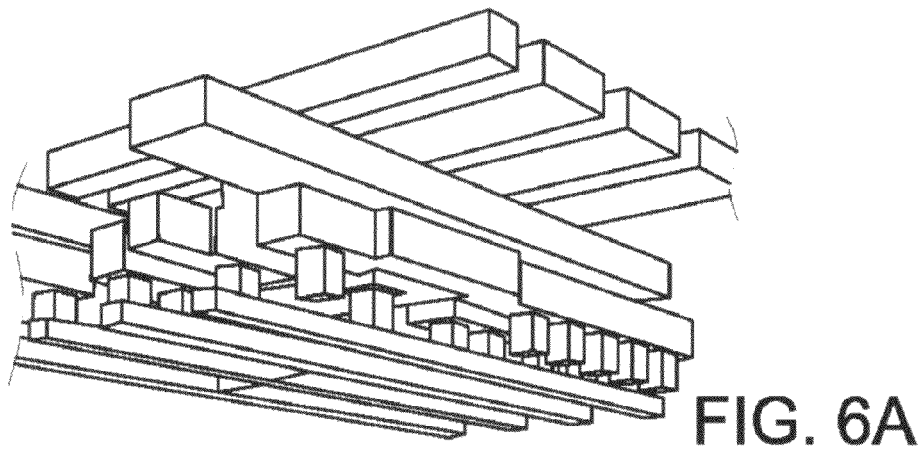
FIGS. 6A and 6B represent a capacitive interaction model between two lines via a dielectric.
Figure 6B:
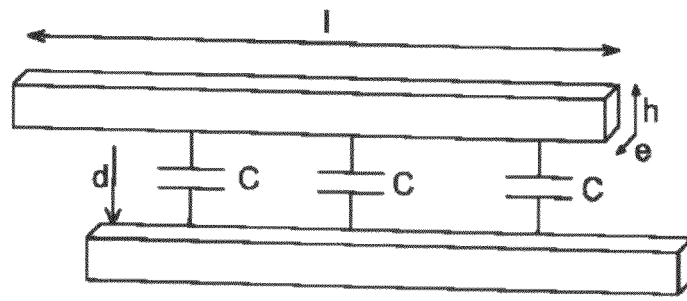

Modelling of the capacitive effects induced between geometric components by magnetic fields may then be performed via a dielectric. FIGS. 6A and 6B represent a capacitive interaction model between two lines via the dielectric (in this respect, see: S. Kapur and D. E. Long, Large-scale capacitance calculation, in 37$^{th}$ Design Automation Conference, pages 744-749, 2000 or Pong, T.-S., Brooke, M. A.: A Parasitics Extraction and Network Reduction Algorithm for Analog VLSI, IEEE Trans. On Computer-Aided Design, Vol. 10, No. 2, February 1991).

It is then possible to perform an extraction of the interconnection circuits for very high frequencies (see B. Krauter and S. Mehrotra, Layout based frequency dependent inductance and resistance extraction for on-chip interconnect timing analysis, in 35$^{th}$ Design Automation Conference, pages 303-308, 1998). This makes it possible to account for the current transmission variation via the introduction of an inductive model. In fact, between two connection points, the imperfection is not only purely resistive but observes an impedance: $z=R+jL\omega$, where $\omega=2\pi f$.

Figure 2:
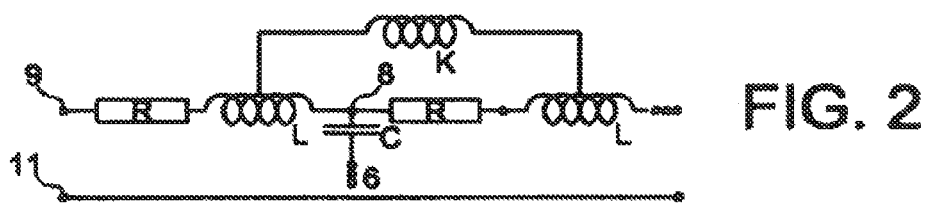
FIG. 2 represents a simple electrical connection network.

In this way, the resulting network is, in a very simple case, of the format of FIG. 2; in this case, it comprises an input port 9, resistors R, inductions L, an internal node 8, the reference 6 referring to an internal network not represented in detail. A common port 11 (electrical common, which may be common to several networks) is also represented. Algorithms are available to perform the extraction of such parasitic networks, for electrical or thermal modelling of the substrate (in, this respect, see J. Kanapla, J. Phillips, and J. White. Fast methods for extraction and sparsification of substrate coupling, in 37$^{th}$ Design Automation. Conference, pages 738-743, 2000), of the interconnection and housing.

These algorithms that can be used can be classified into categories:

the Boolean rule-based geometric extractors, are based on the boundaries or based on pre-characterised formats; however, they are moderately reliable.

context-based extractors, finite elements. These algorithms are more reliable.

According to the invention, on the basis of the mask layouts and technological profiles, the parasitic equations is written in a file or a matrix digital base. This forms a connection network.

A description of the matrix digital base used will now be given.

A differentiation is made between the mathematical writing of a model, consisting solely of values R and C, from that of a model also comprising inductances L and mutual inductances K. However, the final representation is uniform in order to simplify the processing of the base.

Case of RC Model:

A connection network 10 (FIG. 7A) may be set up in the form of linear equations according to Kirchoff's law. The network 10 is compartmentalised into three parts: $Y_{ee}$ for external connection admittances, $Y_{ie}$ and $Y_{ii}$ for internal admittances.

Figure 7A:
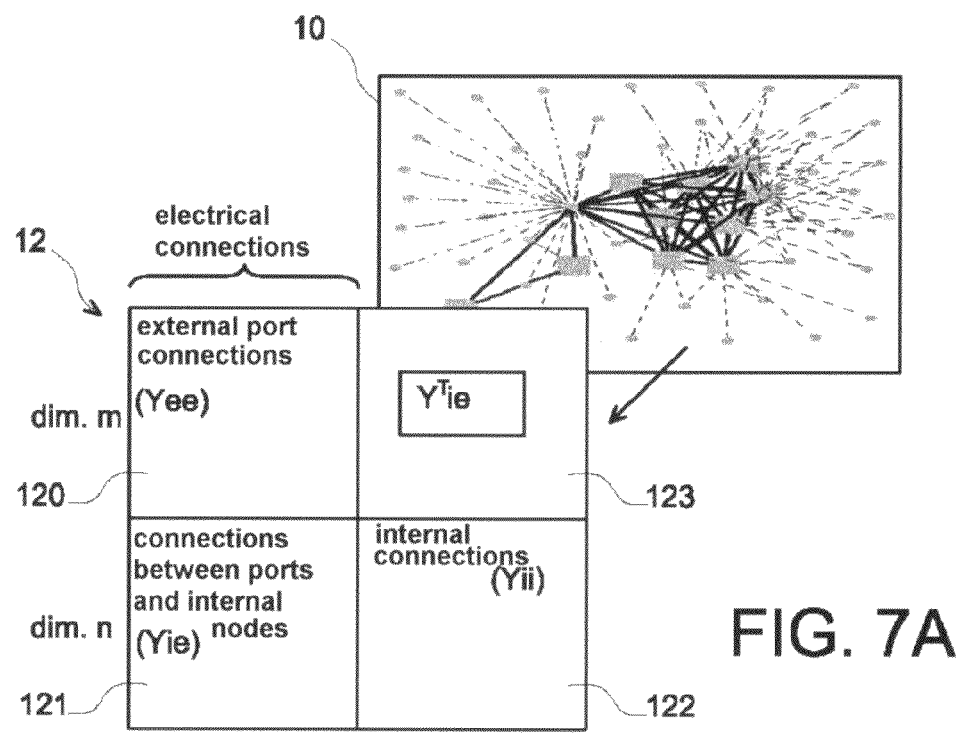
FIGS. 7A and 7B are modular descriptions of a model for each RC network. The terms Y and C refer to the admittances and susceptances of a part of the system, respectively.

This operation results in a symmetric matrix of the dimension m+n, m+n, designated by reference 12 in FIG. 7A.

In a block 120 of the size m×m of this matrix, the conductances ($Y_{ee}$) of the external port connections are arranged.

In the block 121 of the size n×n, located under this first block, the connections between the ports and internal nodes ($Y_{ie}$) are arranged.

In the third block 122, at the bottom right of the matrix, of the size n×n, the conductances ($Y_{ii}$) of the internal connections are arranged.

The block 123, at the top right of the matrix, is the transposition of the block 121.

Figure 7B:
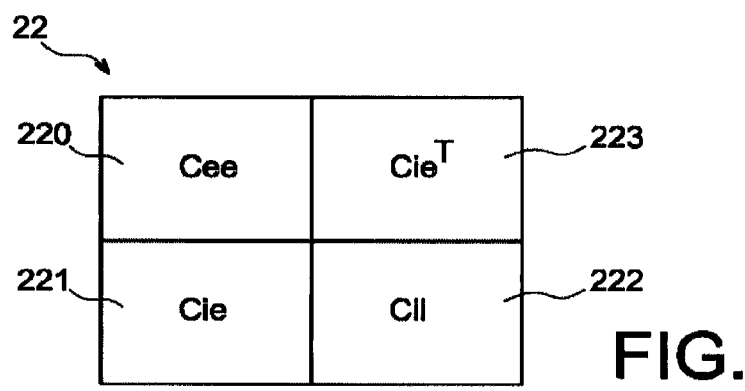

A matrix 22 of the same structure is built for the capacitances: see FIG. 7B comprising a first sub-matrix 220 $C_{ee}$, a second sub-matrix 221 $C_{ie}$, a third sub-matrix 222 $C_{ii}$, and a fourth sub-matrix 223, in fact the transposition of the sub-matrix 221.

Figure 7C:
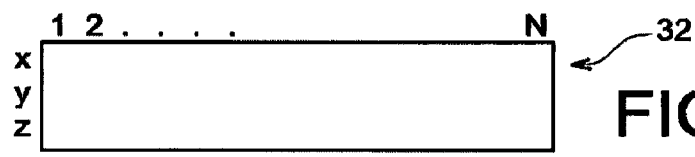
FIG. 7C is a geometric representation, in matrix form, of a circuit.

Finally, a third matrix, of the size 3×N, contains information relating to the position x, y, z, of the external ports (in number N in the space). (Reference 32, FIG. 7C).

The definition or selection of the "external" ports involves the breakdown of the network into sub-networks, having low couplings with each other. The network(s) are partitioned in view of the coupling capacitances between the ports.

Figure 13A:
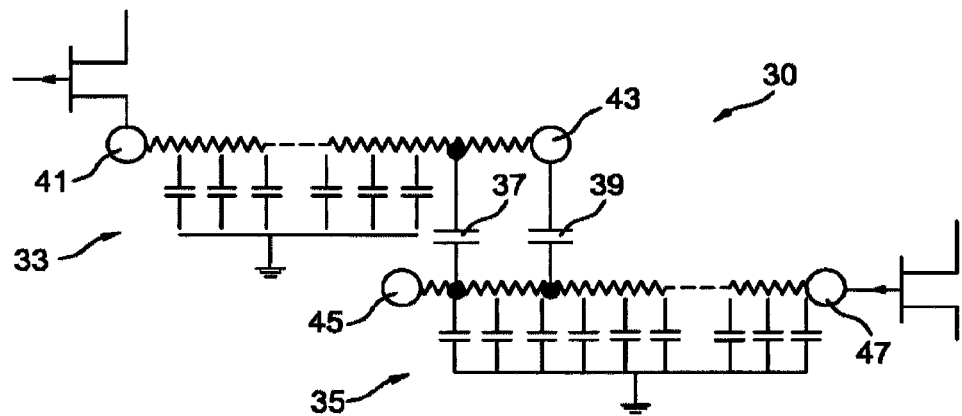
FIGS. 13A and 13B represent a network wherein two sub-networks are coupled by coupling capacitance (FIG. 13A), and the two sub-networks are separated accounting for the coupling (FIG. 13B), respectively.
Figure 13B:
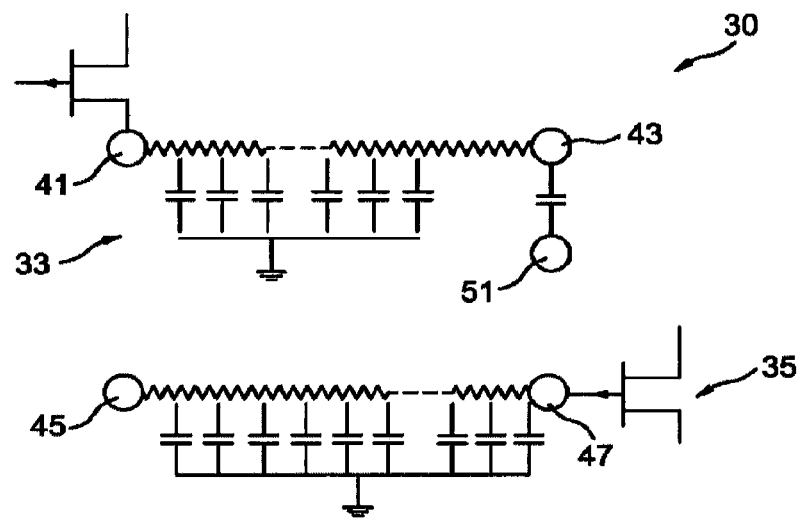

FIG. 13A represents a network 30 wherein two sub-networks 33, 35, are coupled by coupling capacitances 37, 39. Each of these two sub-networks comprises two ports 41, 43 and 45, 47. Then, both sub-networks are separated accounting for the coupling (FIG. 13B). Therefore, the sub-network 33 comprises 3 ports 41, 43, 51 instead of 2 ports 41, 43 in the schematic in FIG. 13A. The coupling capacitances C are also summed or grouped so that $n_i > n_e^2$ (number $n_e$ is the number of external nodes of a sub-network and $n_i$ the number of its internal nodes). A criterion selected for the grouping or summing of the coupling capacitances may be as follows: a coupling capacitance Cc may be shifted (coupling of internal node shifted to an external node) along a resistive path (node i to node j) if the product verifies:

$$\sum_i Cc * \sum_{i \to j} R \gg 2 * \prod * \text{Operating\_frequency}$$

where $$\sum_i Cc$$

is the sum of the capacitances shifted to a node i.
Where $$\sum_{i \to j} R$$

is the sum of the resistances along which the coupling capacitances are moved up (internal node i to external node j). It is possible to try to shift the coupling capacitances as close to the ports as possible by observing the criterion given above. In other words, an internal node is retained as a new port and it is verified that $n_i > n_e^2$ to separate the two networks. In the case where an internal node was promoted to an external node (port), it is then possible to group the coupling connections to these new external nodes to minimise the criterion. For RLC, this is equivalent with respect to the couplings Cc. For RLCK, it is different: if two networks are coupled via mutual inductances k, it will not be possible to separate them. However, the method explained above will apply for the rest.

A coupling will be qualified as "low" when the number $n_e$ of external nodes of the corresponding sub-network is low or very small compared to the number $n_i$ of its own internal nodes. A selected criterion may be: $n_e^2 < n_i$, given that, typically, $n_e$ varies between 2 and, for example, $10^4$, but other values may also be envisaged outside this range.

This distribution or this breakdown into sub-networks may lead to a requalification of an "internal" connection as an "external port" or rather, in this case, as a "virtual port".

In total, the total number of external nodes $n_e$ is equal to the number of ports $n_p$ to which the number of virtual nodes $n_v$ is added (these virtual nodes generally relate to capacitive coupling zones). This may also relates to internal nodes to be retained for geometric references such as "layers" or to prevent any densification during reduction.

Due to this requalification, some internal nodes, having become virtual ports, no longer belong to the block ie or block ii of the matrices G and C, but to the block ee (120, 220) of said matrices.

The matrices 12, 22 being defined, it will be possible to perform a reduction of the part relating to the internal connections: for this, it will "eliminate" the connections wherein the specific frequency is greater than the operating frequency of the circuit: in any case, these connections will not play a role during the operation of the circuit. In fact, an elimination is performed by means of projection in a reduced base. The reduced base corresponds to the eigenvectors, calculated on specific frequencies, for example the most significant of the internal network. The most significant frequencies are those supplying information in the operating frequency band. This operation leads to a very significant reduction of the blocks 122, 222 of the matrices 12, 22, as a reduction rate of the order of 95 to 98% is generally achieved. The reduction rate is defined by the ratio between the number of passive components before reduction and after reduction.

This reduction will make it possible to simplify the subsequent operations significantly.

This new representation will make it possible to work with a simplified physical system, and also with a simplified equation system.

At the input, the electrical equation system is written as follows:

$$(G = j\omega C)x = b \qquad \text{Eq. 1}$$

$$x = \begin{vmatrix} x_e \\ x_i \end{vmatrix}, b = \begin{vmatrix} b_e \\ 0 \end{vmatrix}$$

The matrix G is the expression of the sub-network of the conductances and its dimensions are (m+n)×(m+n). C is the matrix of the susceptances, of the same dimensions. x is the vector of the voltages at the port terminals and b the vector of the currents, zero for the internal nodes. The term jω introduces the complex part of the system where $\omega = 2\pi f$, f being the operating frequency in Hertz. The high cutoff frequency to limit the operating frequency band is referenced fc.

$$G = \begin{vmatrix} G_{ee} & G_{ei} \\ G_{ei} & G_{ii} \end{vmatrix} \qquad \text{Eq. 2}$$

$$C\omega = \begin{vmatrix} C_{ee} & C_{ei} \\ C_{ie} & C_{ii} \end{vmatrix} \omega$$

The sub-matrices $G_{ii}$ and $C_{ii}$ correspond to the internal parasitic networks of the circuit, the matrices indexed "ie" to the external connections to the internal network, and the matrices indexed "ee" to the direct connections between external points, or ports, of the circuit.

These matrices are hollow (there are few non-zero values in each column of the matrix) and symmetrical.

An attempt is made to factor the conductance matrix in order to obtain a member $C'_{ii}$ wherein the unit is compatible with the cutoff frequency, in 1/RC.

For this, the congruence transformation based on Cholesky factor L as described in the article by Kevin J. Kerns and Andrew T. Yang. Stable and Efficient Reduction of Large, Multiport RC Networks by Pole Analysis via Congruence Transformations, Proceeding DAC-ACM, 1996.

$$V = \begin{vmatrix} I & -X^T \\ 0 & U^T L^{-1} \end{vmatrix} \quad \text{Eq. 3}$$

$$LL^T = G_{ii}$$

$$X = G_{ii}^{-1} G_{ie} = L^{-T} L^{-1} G_{ie}$$

The matrix V is referred to as the congruence matrix.

The matrix U is a dense rectangular matrix, of the dimensions (m+n,n"), which contains all the eigenvectors of the representative base of:

$$C_{ii}' = L^{-1} C_{ii} L^{-T} = G_{ii}^{-1} C_{ii} \quad \text{Eq. 4}$$

A representative base is a subset of the eigenvectors of $C'_{ii}$ wherein the specific values $\lambda_c^{-1} \leq 2\pi\pi_c$ are less than the operating pulsations. n" is determined by the choice of $f_c$. The user knows in principle in which frequency range he/she wishes to operate the circuit or the network, and he/she can modify or adapt $f_c$ as required according to the envisaged application. Therefore, the invention enables a precision check via the cutoff frequency. This check corresponds to the decomposition phase into eigenvectors of the internal sub-system.

The matrix $C'_{ii}$ may be of a very significant size, for example of the order of several $10^6$ rows by several $10^6$ columns, for example again $50 \times 10^6$ rows by $50 \times 10^6$ columns in size. However, it consists of a hollow matrix, i.e. a matrix comprising a high proportion of zero coefficients.

The decomposition into eigenvectors is discussed below, within the scope of the reduction of the RC model.

The input system (matrices 12 and 22) is transformed by the congruence factor or vector V, such that:

$$\begin{cases} G'' = V^T G V \\ C'' = V^T C V \end{cases} \quad \text{Eq. 5}$$

If this equation system is developed, the following is obtained:

$$\begin{cases} G'' = \begin{vmatrix} I & -X^T \\ 0 & U^T L^{-1} \end{vmatrix} \begin{vmatrix} G_{ee} & 0 \\ G_{ie} & G_{ii} \end{vmatrix} \begin{vmatrix} I & 0 \\ -X & L^{-T} U \end{vmatrix} \\ C'' = \begin{vmatrix} I & -X^T \\ 0 & U^T L^{-1} \end{vmatrix} \begin{vmatrix} C_{ee} & 0 \\ C_{ie} & C_{ii} \end{vmatrix} \begin{vmatrix} I & 0 \\ -X & L^{-T} U \end{vmatrix} \end{cases} \quad \text{Eq. 6}$$

U and Λ describe the internal characteristics of the circuit. They are, respectively, the rectangular matrix of the eigenvectors and the corresponding specific values of the result of the product:

$$L^{-T} C_{ii} L^{-1}.$$

This gives the result of the calculation of the following matrices:
- L is a triangular matrix less than the dimension n. It remains hollow.
- X is a rectangular matrix of the dimension [m,n], which remains hollow.
- U is a dense rectangular matrix of the dimension [m+n, n"].
- Λ is a diagonal matrix of the dimension n"×n".

The matrices $G_{ee}$, $C_{ee}$ and $C_{ie}$ are also hollow matrices. They remain accessible as they are stored in memory. At this stage, there is no attempt to calculate the final-product (given by equation 6 above). In fact, one just tries to retain these, intermediate matrix blocks in memory in order to be able to modify and update $G_{ee}$, $C_{ee}$ and $C_{ie}$ without having to recalculate everything, for each sub-network.

The digital base contains L, X, U, Λ, $G_{ee}$, $C_{ee}$ and $C_{ie}$. It is in the form of compressed files referred to as "models".

There are the same number of models as there are separate equation systems, each separate system corresponding to, or representing, a sub-network, which has a low coupling with other sub-networks.

A digital database comprising a first, modifiable, part, corresponding to the connections, and a fixed part which corresponds to the internal network and which should not be modified.

Case of RLCK Model:

As above (see equation 1 above), the input-output currents Ie may be expressed as a function of the voltage values on each node of the network for the purely RC part and as a function of the internal currents for the RLK part:

$$(G + j\omega C) \cdot \begin{vmatrix} V_e \\ V_{i1} \\ V_{i2} \end{vmatrix} = \begin{vmatrix} I_e \\ 0 \\ 0 \end{vmatrix} \quad \text{Eq. 7}$$

Ie: input-output currents
Ve: input-output voltages
Vi1: internal voltages of RC nodes
Ii2: internal currents of (R)LK nodes
G represents the real conductivity of the network and C the imaginary part of the admittance consisting of the susceptances, inductances and reluctances of the network. G and C are distributed into three sub-blocks:

$$G = \begin{vmatrix} G_{ee} & G_{ie1}^T & G_{ie2}^T \\ G_{ie1} & G_{ii1} & G_{ii2}^T \\ G_{ie2} & G_{ii2} & G_{ii22} \end{vmatrix} \quad \text{Eq. 8}$$

$$C\omega = \begin{vmatrix} C_{ee} & 0 & 0 \\ 0 & C_{ii1} & 0 \\ 0 & 0 & C_{ii22} \end{vmatrix} \omega$$

The equation conversion method observes modified nodal analysis (MNA). Gee and Cee are of the dimensions m×m and represent the conductance of the external network (ports) and the imaginary part of the admittance of said network, respectively.

$G_{ie1}$ contains conductance connections between the external nodes and the internal part of the network according Kirchoff's node law. The sum of the currents being zero for an internal node.

$G_{ie2}$ relates to impedance connections between the ports and the internal nodes according to Kirchoff's mesh law.

The block ii1 is the set of internal conductances defined according to the node law.

The block ii2 is the set of connections between the RC conductances and the RLK impedances.

Finally, the block ii22 represents the RLK impedance connections defined on the internal nodes by means of the mesh law (in this respect, see the article by Kevin J. Kerns and Andrew T. Yang. Preservation of Passivity During RLC Network Reduction via Split. Congruence. Transformations. DAC 1997).

In order to prepare the reduction based on the specific values of the internal network (ii), the set of specific values of the singular system are extracted:

$$C'_{ii} = G_{ii}^{-1} \cdot C_{ii} \qquad \text{Eq. 9}$$

where, $$G_{ii} = \begin{vmatrix} G_{ii1} & G_{ii2}^T \\ G_{ii2} & G_{ii3} \end{vmatrix}$$

$$C_{ii} = \begin{vmatrix} C_{ii1} & 0 \\ 0 & C_{ii3} \end{vmatrix}$$

The extraction method may be performed by means of the projection/factoring algorithms based on Krylov's sub-spaces, as explained for example in the article by R. Radke, A MATLAB Implementation of the Implicitly Restarted Arnoldi Method for Solving Large-Scale Eigenvalue Problems, Dept of Computational and Applied Math., Rice University, Houston, Tex., or in the article by D. C. Sorensen, Implicit Application of Polynomial Filters in a k-step Arnoldi Method, SIAM journal on Matrix Analysis and Applications, volume 13, number 1, 1992, pp 357-385, or in the article by R. B. Lehoucq and D. C. Sorensen, Deflation Techniques within an Implicitly Restarted Iteration, SIAM Journal on Matrix Analysis and Applications, volume 17, 1996, pp 789-821.

These methods relate to positive non-defined systems.

In order to retain the characteristics of the internal systems, the digital analysis is separated into two blocks, wherein each calculates the base of the associated eigenvectors $U_1$ and $U_2$, such as congruence (eq. 10) reduces the internal dimension and retains the characteristics of the conductances and the specific values.

$$\begin{bmatrix} I & 0 & 0 \\ 0 & U_1^T & 0 \\ 0 & 0 & U_2^T \end{bmatrix} \qquad \text{Eq. 10}$$

$$\left( \begin{bmatrix} G_{ee} & G_{ie1}^T & G_{ie2}^T \\ G_{ie1} & G_{ii1} & G_{ii2}^T \\ G_{ie2} & G_{ii2} & G_{ii22} \end{bmatrix} + \omega \begin{bmatrix} C_{ee} & 0 & 0 \\ 0 & C_{ii1} & 0 \\ 0 & 0 & C_{ii22} \end{bmatrix} \right) \begin{bmatrix} I & 0 & 0 \\ 0 & U_1 & 0 \\ 0 & 0 & V_2 \end{bmatrix}$$

In order to extract the reduced sub-bases $U_1$ and $U_2$ and the associated specific values, the decomposition into Krylov sub-spaces is performed according to two hypotheses, respectively (equation 11):

$$\begin{cases} U_1 \to Krylov(A^{-1}C_{ii}, A^{-1}G_{ie}), \omega = 0 \\ U_2 \to Krylov(A^{-1}C_{ii}, A^{-1}G_{ie}), \omega = \omega_c \end{cases} \qquad \text{Eq. 11}$$

It should be noted that $U_1$ can be calculated in the same way as with equation 4.

In this case, U is the projection and reduction matrix of the internal network of the dimensions m×n', where n'=n$_1$'+n$_2$' (eq. 12):

$$U_{left} = [U_1 U_2], U_{right} = [U_1 V_2] \qquad \text{Eq. 12}$$

U consists of two sub-blocks of vectors wherein the dimensions comply with equation 10.

In order to check that best compromise between the reduced dimension n$_1$' and the preservation of the internal poles, $\omega_c \geq 2\pi f_c$ (cutoff pulsation) is stated and $U_1$ is calculated such that the set of associated specific values $\{\lambda_c\}$ verifies: $\lambda_c^{-1} \leq 2\pi f_c$.

Therefore, here again, the invention enables a precision check via the cutoff frequency. This check corresponds to the decomposition phase into eigenvectors of the internal subsystem.

$U_2$ is extracted from the following system (eq. 13):

$$\begin{cases} P = A^{-1}C_{ii} \\ Q = A^{-1}G_{ie} \end{cases} \qquad \text{Eq. 13}$$

where $A = G_{ii} + \omega_c C_{ii}$ and $\omega_c$ is the cutoff pulsation.

For this, the bases stated by the PRIMA algorithm described in the article by Altan Odabasioglu, Mustafa Celik and Lawrence T. Pileggi. PRIMA: Passive Reduced-Order Interconnect Macromodeling Algorithm. IEEE, 1997 (see also: Altan Odabasioglu, Mustafa Celik and Lawrence T. Pileggi. Practical Considerations For Passive Reduction of RLC Circuits. IEEE, 1999), with, however, a decomposition which is based on an Arnoldi IRAM method as described in the article by Lehoucq et Sorensen mentioned above. In fact, the latter guarantees the stability of the reduced system.

The following are focused upon:
firstly, the projection base generation by $[U_2, \wedge_1] = iram(P, n_2')$, where $\wedge_1$ refers to the diagonal matrix of the specific values of P,
and, secondly, the projection base generated by $[V_2, \wedge_2] = iram(Q, n_2')$, where $\wedge_2$ refers to the diagonal matrix of the specific values of Q.

The dimension n$_2$' is stated and corresponds to a minimum number of preserved moments. As the system has been shifted in terms of frequency (see eq. 13), it is not necessary to decompose the system excessively around this frequency. This parameter n$_2$' will be able to vary in the interval [2-8]. For more precision on the major variations, it is still possible to repeat a frequency shift (see eq. 11) for other intermediate points, for example: $\omega_c/2$, and complete the projection base (eq. 12), without omitting the reorthogonalisation of U.

Subsequently, the writing of U will be simplified such that there is only one decomposition:

$$U = [U_1 U_2] \qquad \text{Eq. 14}$$

In fact, by means of experimentation, it can be observed that it is not necessary to make a distinction between the right and left decomposition (eq. 12). For simplification reasons, we will continue with equation 14.

The system is then projected on the new base U:

$$G' = \begin{vmatrix} I & 0 \\ 0 & U^T \end{vmatrix} \begin{vmatrix} G_{ee} & G_{ie}^T \\ G_{ie} & G_{ii} \end{vmatrix} \begin{vmatrix} I & 0 \\ 0 & U \end{vmatrix}. \qquad \text{Eq. 15}$$

$$C' = \begin{vmatrix} I & 0 \\ 0 & U^T \end{vmatrix} \begin{vmatrix} C_{ee} & C_{ie}^T \\ C_{ie} & C_{ii} \end{vmatrix} \begin{vmatrix} I & 0 \\ 0 & U \end{vmatrix}$$

In this case, G' and C' are of reduced dimensions m'+n. The hollow matrices $G_{ee}$ and $C_{ee}$ remain accessible as they are stored in memory. Only the internal index network ii is affected by the transformation.

The digital base 100 contains U, $G_{ee}$, $C_{ee}$, $G'_{ie}$, $C'_{ie}$, $G'_{ii}$ and $C'_{ii}$. It is in the form of compressed files referred to as "models". The indexed matrices "ee" (external-external connections) and "ie" (external-internal connections) remain modifiable.

Case of Geometric Model:

The RLCK passive components have coordinates with three dimensions x, y and z. These coordinates are stored in memory, for example in the base 100, in order to enable the extractors to update some components, but also to use said geometric data with a view to simplifying the RLK connections and, finally, to enable the simulators to locate the problem diagnosed during the analyses.

The coordinates of the nodes are in a vector p, separated into two subvectors of the respective dimensions m and n:

$$p = [(x,y,z)_{ee}(x,y,z)_{ii}]$$

$$q = [(\text{port name})(\text{internal node name})] \quad \text{Eq. 16}$$

The dimension of the sub-vector ii may be modified after transformation. In this case, one the first n" coordinates will be retained. The correspondence between the geometric coordinates and the abscissas of the system is determined via the node name vector.

The dimension 'z' corresponds to the change of mask layer. It is used by the three-dimensional extractors such as for the substrate for example.

In order to enable the extractors to modify the base on a targeted or limited part, the modification request query uses the following criteria:

Name of sub-network,
Name of nodes or coordinates of the nodes to be modified.

In return, a part of G and a part of C are made accessible for the modification of the values or nodes.

After calculating the local projection bases, only the non-transformed parts (indexed in "ie" and "ee") are modifiable. Otherwise, the system is stored digitally with no transformation.

The internal representation of both types of RC and RLCK models makes it possible to rewrite the initial system directly with a considerably reduced number of internal nodes.

The various model reductions are explained below.

RC Model:

By continuing the development (eq. 6), the following is obtained:

$$\begin{cases} G''_{ee} = G_{ee} - G_{ie}^T X \\ G''_{ie} = 0 \\ G''_{ii} = I \\ C''_{ee} = X^T C_{ii}^T X - C_{ie}^T X - X^T C_{ie} \\ C''_{ie} = U^T L^{-1} C_{ie} - U^T L^{-1} C_{ii} X \\ C''_{ii} = \Lambda \end{cases} \quad \text{Eq. 17}$$

$\Lambda$ is a diagonal matrix of the eigenvalues $\lambda_i$, de dimension n". The entire reduced system remains symmetrical.

All the sub-matrices of $G''_{ii}$, $C''_{ie}$ and $C''_{ii}$ are then redesigned to a lower dimension as n" is the number of specific values remaining significant.

Figure 11:
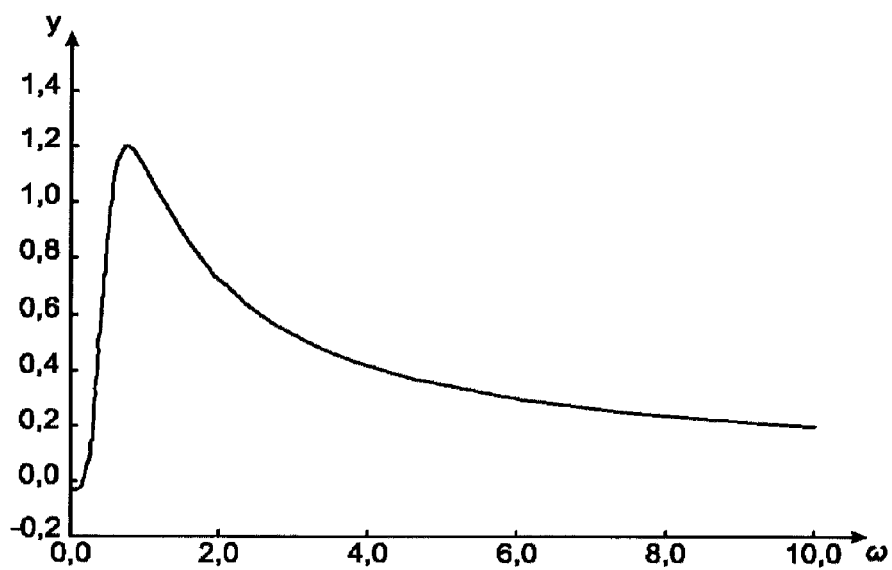
FIGS. 11 and 12 illustrate Y phase simulations between an input and an output during network reductions.

In the example in FIG. 11, an RC network of the dimensions 200,000×200,000 is reduced to the dimensions 50×50. A comparison curve is plotted thereon on the phase $Y(\omega)$ between an input and an output. The curves are combined. The same applies for all the combinations $Y_{ij}(\omega)$.

RLCK Model:

The model is redesigned by applying the following transformation:

$$\begin{cases} G'_{ee} = G_{ee} \\ G'_{ie} = U^T G_{ie} \\ G'_{ii} = U^T G_{ii} U \\ C'_{ee} = C_{ee} \\ C'_{ie} = U^T C_{ie} \\ C'_{ii} = U^T C_{ii} U \end{cases} \quad \text{Eq. 19}$$

Only the blocks ie and ii are projected on the reduced base of dimensions m×n'.

The entire reduced system remains symmetrical. In this case, the reduced equation system is written as follows:

$$Y'' = G' + j\omega C' \quad \text{Eq. 20}$$

This system has the dimensions n'×n'.

Figure 12:
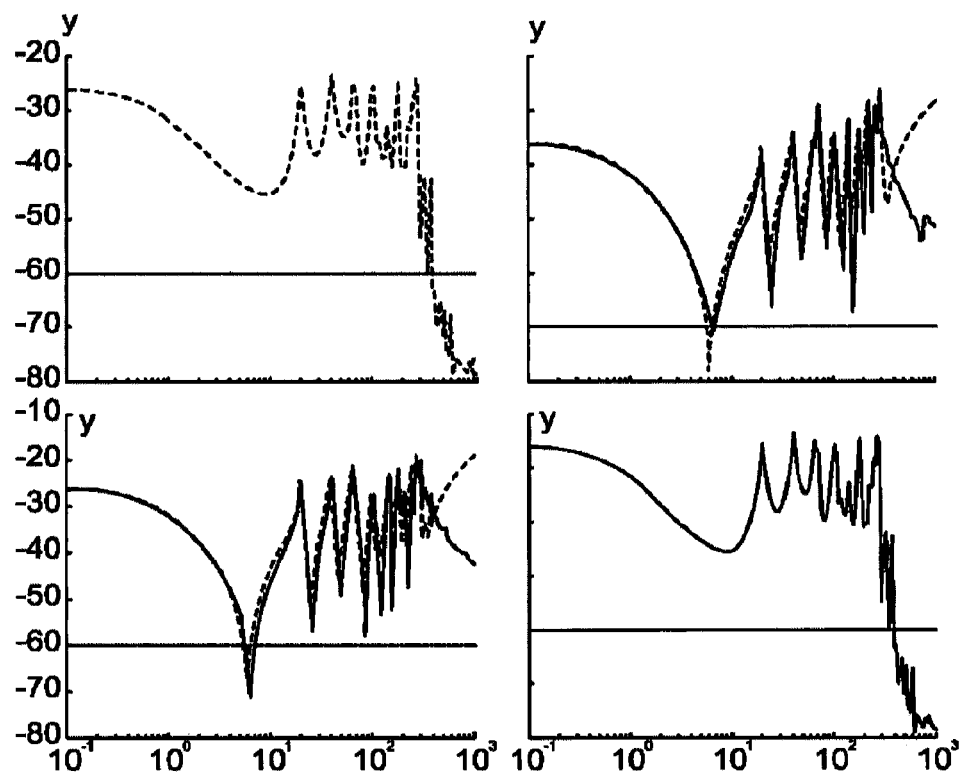

In the example in FIG. 12, an RLCK network of the dimensions 1000×1000 is reduced to dimensions 95×95, with satisfactory precision on a satisfactory frequency range. The RLCK network (1000×1000) is represented as a dotted line and the RLCK network reduced to (95×95) as a solid line. The plots are those of the simulations $Y_{11}(\omega)$, $Y_{12}(\omega)$, $Y_{21}(\omega)$ and $Y_{22}(\omega)$.

The processing of a method according to the invention will now be illustrated.

For optimum processing of the information a priori given to a simulator, the initial equation system is combined with another system $Y_p$ referred to as "connections". In other words, the system $Y_p$ represents the external connectivity introduced by the electrical connections for the simulation. In fact, when the electrical information changes, it is not necessary to repeat the previous calculations entirely but simply to rearrange and merge the two systems (initial equation system and system $Y_p$):

$$\begin{vmatrix} Y_p & -Y_p^T & 0 \\ -Y_p & Y_p + Y''_{ee} & Y''_{ei} \\ 0 & Y''_{ie} & Y''_{ii} \end{vmatrix} \begin{vmatrix} x_p \\ x_e \\ x_i \end{vmatrix} = \begin{vmatrix} b_p \\ 0_e \\ 0 \end{vmatrix} \quad \text{Eq. 21}$$

$Y_p$ represents the external connectivity introduced by the electrical connections for the simulation. In this way, the user can adjust, or modify, $Y_p$ and/or $x_p$, the latter as an external voltage value connected to the initial system, and on $b_p$, the resulting current.

Figure 8:
FIG. 8 represents a connection of the ports adapted to a simulation.

The information assumed to be electrical from the simulator makes it possible to reduce the area of the external connections. In fact, this makes it possible to reduce all the port-to-port transfer functions, as shown in FIG. 8. In this figure, the input $S_i$ and parasitic signals $S_p$ are represented at the input (on the input ports) and the output signal $S_O$ is represented at the output (on the output ports).

By means of the vectorial information on the electrical port connection, the simulation can then be simplified. In fact, if $Y_p$ has a number of ports considerably lower than the dimension of the block ee, it is then possible to reduce the system by taking $Y_p$ as the external block ee and the remainder as the internal block ii, which decreases the number of transfer functions considerably.

The invention makes it possible to produce a complete system to address the simulation of the physical models of an entire printed circuit. This means that all the analogue, digital, substrate, housing and other parts have a single digital representation, that is reducible and adapted directly to the simulators. This results in a considerable acceleration of the model extraction and simulation phases, particularly as the methods make it possible to modify the model locally and simulate it dynamically. The digital representation of the model, reduced or not, can be stored or stored in memory.

The invention makes it possible to store the eigenvectors of the system, moments and stability of the reduced system in memory. The hollow matrices are also retained.

The invention enables the simulation of a circuit by means of a faithful, but compressed, representation of the data, in the form of transfer functions which retain the eigenvalues, moments (linear combination of eigenvectors), the stability and passivity of the system.

It is possible to rectify any part other than the purely internal part if the results of the simulation are not satisfactory.

The invention makes use of projection methods which make it possible to check the precision as a function of the operating frequency, in a single projection, without heuristics.

In addition, the invention makes it possible to modify some connections with a reduced representation for all the networks. It makes it possible to provide a compromise between the modifiable nature and the reduced nature for all the models.

According to the invention, all the networks are processed uniformly in a partially pre-reduced digital database. Therefore, the invention makes it possible to process any system in its entirety.

The invention particularly applies to any circuit operating at more than 5 GHz, from which more complex interactions than at frequencies below 5 GHz occur.

Figure 9:
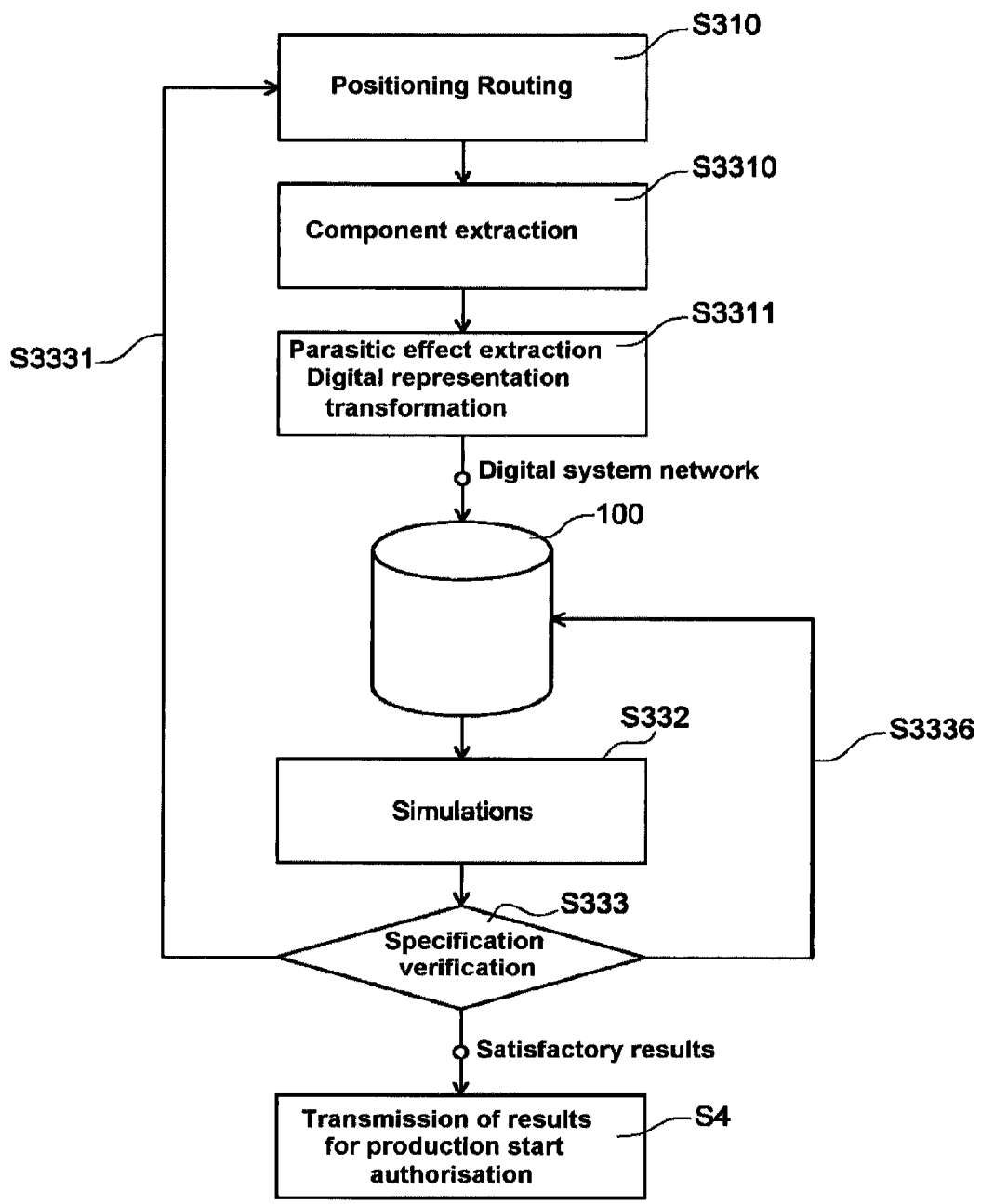
FIG. 9 is a representation of the steps of a circuit simulation and production method according to the invention.

FIG. 9 represents a new design and simulation method implementing the invention: with respect to the schematic in FIG. 1B, described above, the differences are as follows.

If, following a simulation, an error is observed, the operator can modify the position of the masks, for example directly on a display screen (S331).

An extraction is then performed again (of the components: S3310; of the parasitic effects: S 3311), which will make it possible to feed a database or a set of files 100 with data, in fact the data from the matrices G, C.

Figure 1A:
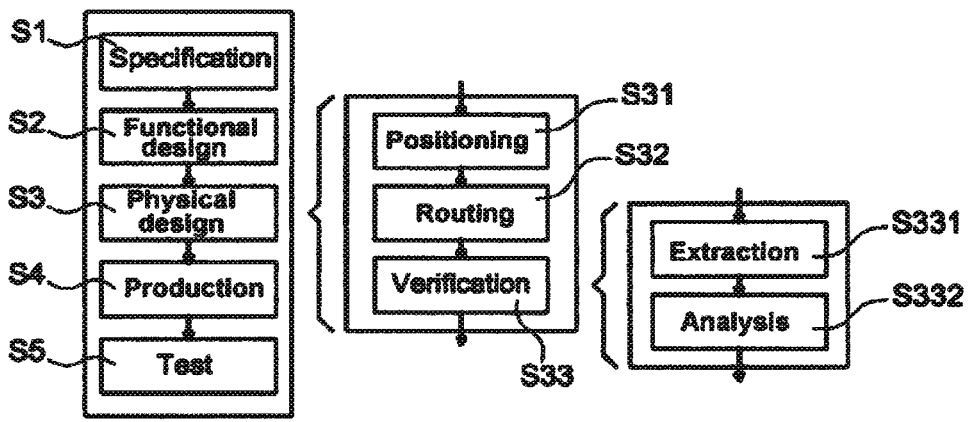
FIG. 1A is a schematic representation of the location of the verification tools in the printed circuit design.
Figure 1B:
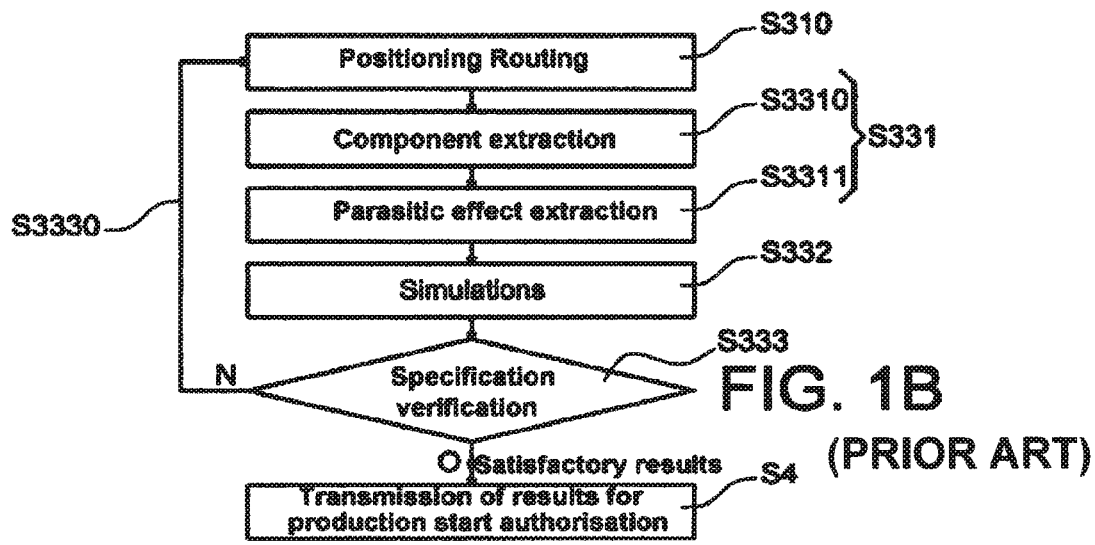
FIG. 1B represents steps of a circuit simulation and production method according to the prior art.

As these matrices are, for the strictly internal part, considerably reduced, the simulation operation S332 is performed in a much shorter time than in the case of a known method, such as that in FIG. 1B.

In fact, when a modification is made on the masks, these modifications are reflected on the data 100, but in a limited manner as only the files corresponding to the modified parts of the circuit are modified.

As a result, both the updating of the data and the simulation operations will be accelerated considerably.

In addition, local modifications S3336 of the matrices $C_{ee}$, and/or $C_{ie}$, and/or $G_{ee}$ may be performed directly in the base 100, which avoids the steps S310, S3310, S3311.

Figure 10A:
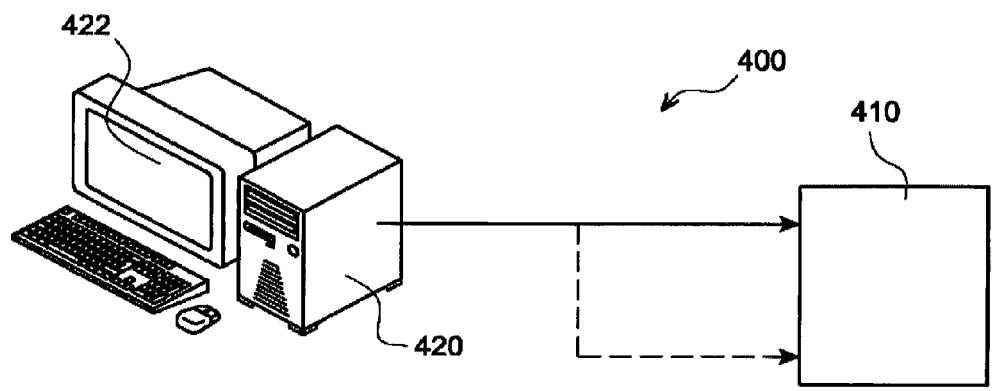
FIGS. 10A and 10B are schematic representations of a device to implement a method according to the invention.

FIG. 10A represents a PC 420 configured in a suitable manner for the processing of the information relating to a circuit according to a method according to the invention.

The masks, and/or thicknesses of each component, and/or the doping profiles and/or the interactions between neighbouring items represent parameters (modelled R, C, L), of an initially considerable number and which represent an initial description of the entire circuit.

Reduced mathematical modelling are used, as explained above.

For example, a matrix is represented in the form of a matrix of a dimension equal to, only, that of the inputs-outputs used. The simulator makes it possible, on the basis of an input voltage vector, to see how the circuit behaves.

According to the invention, the entire internal network, anything which has no external connections, is reduced. Only the inputs and the outputs are retained, ensuring that the transfer functions from an input to an output are retained.

For this reason, a reduced equation system, as explained above, is provided and the reduced transfer functions may be deduced. Only this transfer function system can be stored in memory.

The PC 420 comprises a computation section with all the electronic, software or other components, necessary for the simulation of the behaviour of the circuit tested using this processing.

Figure 10B:
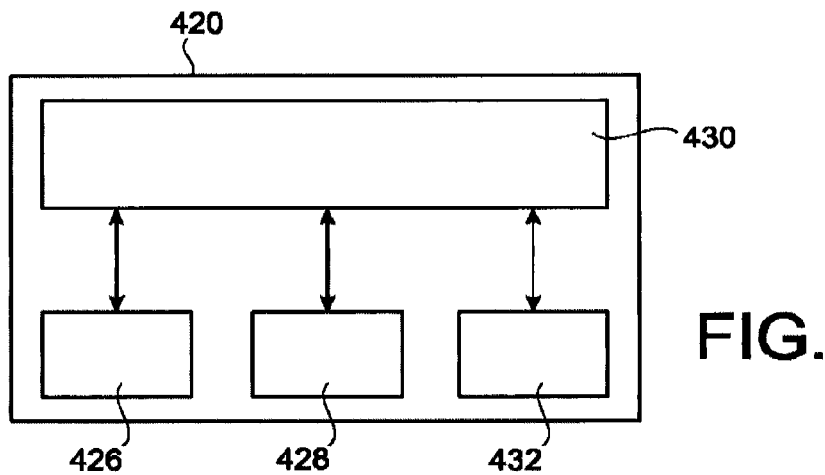

In this way, for example (FIG. 10B), the system 420 comprises a programmable processor 426, a memory 428 and an input device, for example a hard disk 432, coupled with a system bus 430. The processor may be, for example, a microprocessor, or a CPU processor or graphic workstation. The memory 428 may be, for example, a hard disk, a ROM read-only memory, a compact optical disk, a DRAM dynamic random access memory or any other type of RAM memory, a magnetic or optical storage components, registers of other volatile and/or non-volatile memories. Processing algorithms according to the invention, of calculations on the basis of circuit data, comprise instructions liable to be stored in memory and which make it possible to perform test simulations as described above on a reduced circuit according to the invention, in accordance with any of the embodiments of the present invention.

A program, used to implement the method according to the invention is resident or recorded on a medium (e.g.: diskette or CD-ROM or DVD-ROM or removable hard disk or magnetic medium) liable to be read by an information system or by the PC 420.

The PC 420 may be also connected to other peripheral devices, such as for example, printing devices. It may be connected to an Internet type electronic network, used to send data relating to the simulation results.

Figure 3:
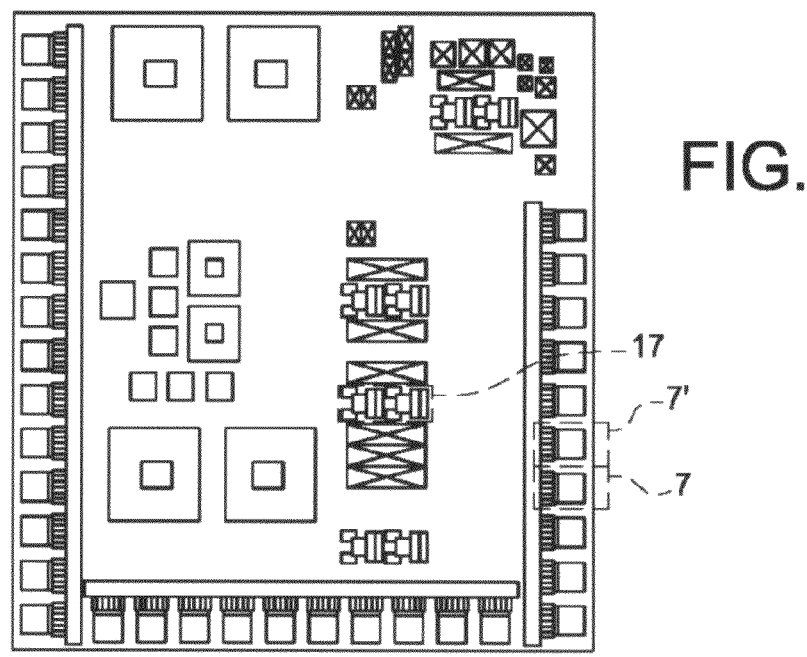
FIG. 3 represents a mask layout, based on the circuit design.

It is possible to display a representative image of a simulation result on the screen 422 and also an image of a mask layout such as that in FIG. 3 or comparison or modelling curves such as those in FIG. 11 or 12.

Once the circuit has been tested satisfactorily by the design engineer, it can be produced (step S4 in FIG. 1) and physically tested (step S5).

Circuit production means, such as those known in the semiconductor and printed circuit industry, may then be used, when the simulation result obtained with an electronic circuit simulation device according to the invention is satisfactory.

Therefore, a method and a device according to the invention plays an important role in the production of a printed circuit, as they make it possible to save considerable time in the development and production of such a circuit.

The invention claimed is:

1. Simulation method of an electronic circuit or a printed circuit, represented in the form of masks and connections, comprising:
   a) defining, on one hand, inputs and outputs of circuit networks of the electronic circuit, and, on the other, internal components of each network,
   b) forming a reduced model of each network comprising:
      b1)•forming a conductance matrix or a resistance matrix, and also forming: a susceptance matrix; a susceptance and inductance matrix; or a susceptance, inductance and reluctance matrix, of inputs and internal components of the network,
b2)•forming a first reduced digital model of said conductance or resistance matrix, and of said susceptance matrix; susceptance and inductance matrix; or susceptance, inductance and reluctance matrix,
c) simulating the network using the first reduced digital model,
d) in an event of an unsatisfactory simulation result, modifying part of the masks and/or connections of one or more networks, forming a second reduced digital model, and simulating with said new reduced model,
e) in an event of a satisfactory simulation result, producing the circuit, wherein couplings between the circuit networks are low couplings, a network being subject to low coupling if the number $n_e$ of external nodes of the network is below the number $n_i$ of specific internal nodes of the network.

2. Method according to claim 1, the reduction according to step b2) being obtained by removing the connections having frequencies greater than an operating frequency of the network.

3. Method according to claim 1, the reduction according to step b2) using a projection in a reduced base.

4. Method according to claim 1, wherein forming a first reduced digital model achieves a reduction rate greater than 95%.

5. Method according to claim 1, wherein, for components other than internal components, a formed conductance or resistance matrix, susceptance and inductance matrix, or susceptance, inductance and reluctance matrix is a hollow matrix.

6. Method according to claim 5, wherein said hollow matrices are stored in memory.

7. Method according to claim 6, wherein, in the event of an unsatisfactory simulation result, said hollow matrices are modified.

8. Method according to claim 1, a network being subject to low coupling if the number ne of external nodes of the network and the number $n_i$ of specific internal nodes of the network complies with the equation: $ne^2 < n_i$.

9. Method according to claim 1, comprising a storage step of geometric components of each network in memory.

10. Method according to claim 1, step d) comprising:
the indication of at least one network to be modified and/or at least one node or coordinates of a node of said network,
at least one modification of the reduced model of said network.

11. Method according to claim 1, the reduced network model being an RLCK type.

12. Method according to claim 1, the circuit containing digital means.

13. Method according to claim. 1, the circuit 30 containing analogue means.

14. Method according to claim 1, the circuit being on a substrate.

15. Method according to claim 1, the circuit being in a housing.

16. Method according to claim 1, the models of several networks being stored in memory in a database.

17. Method according to claim 16, the modification of part of the masks of one or more networks, referred to as modified networks, resulting in a modification of files of said database corresponding to said modified networks.

18. Method according to claim 16, the modification of one or more networks, or of a part of the connections of one or more networks, referred to as modified networks, being a direct modification of the files of said database corresponding to said modified networks.

19. Method according to claim 1, step b) being performed hierarchically.

20. Method according to claim 19, the simulation step c) being performed in cascade according to the hierarchy of step b).

21. Method according to claim 1, the simulation step c) being performed using the reduced model and a matrix system (Yp) of external connections of the network.

22. Simulation device of an electronic circuit, represented in the form of masks and connections, comprising:
a) means for defining, on one hand, inputs and outputs of networks of the circuit, and, on the other, the internal components of said networks,
b) means for forming or calculating a reduced model of each network, comprising:
b1)•means for forming or calculating a conductance matrix or a resistance matrix of the internal components, and also for forming or calculating a susceptance and inductance matrix, or a susceptance, inductance and reluctance matrix, of these inputs and internal components of the network,
b2)•means for forming a first reduced digital model of the conductance or resistance matrix of the internal components, along with the susceptance and inductance or susceptance, inductance and reluctance matrix of said internal components,
c) means for simulating the network using the first reduced digital model,
d) in an event of an unsatisfactory simulation result, means for modifying part of the masks and/or connections of one or more networks, to form a second reduced digital model, and to perform a simulation with said new reduced model,
wherein couplings between circuit networks are low couplings, a network being subject to low coupling if the number $n_e$ of external nodes of the network is below the number $n_i$ of specific internal nodes of the network.

23. Device according to claim 22, the reduction means b2) comprising means to eliminate connections having frequencies greater than an operating frequency of the network.

24. Device according to claim 22, the reduction means b2) comprising means to carry out a projection in a reduced base.

25. Device according to claim 22, comprising means for storing the formed or calculated conductance or resistance matrices in memory, and for storing the formed or calculated susceptance and inductance matrix or the susceptance, inductance, and reluctance matrix.

26. Device according to claim 25, the matrices stored in memory being hollow matrices.

27. Device according to claim 26, also comprising means to modify, in the event of an unsatisfactory simulation result, said hollow matrices.

28. Device according to claim 22, comprising means storing geometric coordinates of components of each network in memory.

29. Device according to claim 22, the means to modify a part of the masks and/or connections of one or more networks comprising means to indicate:
at least one network to be modified and/or at least one node or coordinates of a node of said network,
at least one modification of the reduced model of said network.

30. Device according to claim 22, comprising means storing geometric coordinates of components of each network in memory.

31. Device according to claim 22, the models of several networks being stored in memory in a database.

32. Device according to claim 31, the modification of part of the connections of one or more networks, referred to as modified networks, resulting in a modification of files of said database corresponding to said modified networks.

33. Device according to claim 31, the modification of part of the connections of one or more networks, referred to as modified networks, being a direct modification of files of said database corresponding to said modified networks.

34. Device to produce an electronic circuit, comprising a simulation device of an electronic circuit according to claim 22, and means to produce said circuit in the event of satisfactory simulation results.

\* \* \* \* \*